US007452176B2

(12) United States Patent
Priepke

(10) Patent No.: US 7,452,176 B2
(45) Date of Patent: Nov. 18, 2008

(54) MATERIAL CLAMPING MECHANISM

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 343 days.

(21) Appl. No.: 11/106,310

(22) Filed: Apr. 14, 2005

(65) Prior Publication Data

US 2006/0245872 A1 Nov. 2, 2006

(51) Int. Cl.
*B62B 1/06* (2006.01)

(52) U.S. Cl. .................................................... 414/621

(58) Field of Classification Search ................ 414/24.5, 414/111, 551, 621, 543, 619, 620
See application file for complete search history.

(56) References Cited

U.S. PATENT DOCUMENTS

| | | | | |
|---|---|---|---|---|
| 3,595,416 | A | 7/1971 | Perrotti | 214/767 |
| 4,030,626 | A | 6/1977 | Durham | 214/767 |
| 4,076,138 | A | 2/1978 | Honomichl, Sr. | 214/518 |
| 4,282,969 | A | 8/1981 | Zipser | 198/747 |
| 4,329,102 | A | 5/1982 | Gray | 414/24.5 |
| 4,370,796 | A | 2/1983 | Wilson | 29/564.3 |
| 4,459,075 | A | 7/1984 | Eichenberger | 414/24.5 |
| 4,600,350 | A * | 7/1986 | Matthewson et al. | 414/267 |
| 4,604,018 | A | 8/1986 | Kruse | 414/44 |
| 4,789,289 | A | 12/1988 | Wilson | 414/24.6 |
| 4,952,111 | A * | 8/1990 | Callahan | 414/111 |
| 5,209,536 | A | 5/1993 | Rogers | 294/88 |
| 5,359,753 | A * | 11/1994 | Leifeld et al. | 19/97.5 |
| 5,507,612 | A * | 4/1996 | Siebenga | 414/111 |
| 5,829,233 | A | 11/1998 | Stirling | 53/567 |
| 5,882,163 | A | 3/1999 | Tilley | 414/111 |
| 5,938,399 | A | 8/1999 | Knutson | 414/722 |
| 5,984,617 | A * | 11/1999 | Seaberg | 414/623 |
| 6,267,547 | B1 | 7/2001 | Lund | 414/697 |
| 6,312,205 | B1 | 11/2001 | Vandenberg | 414/24.5 |
| 6,336,786 | B1 * | 1/2002 | Domann | 414/729 |

OTHER PUBLICATIONS

Sales Brochure "Haying Mantix"; 7 pages; Justice Enterprises, Inc.
Sales Brochure "Stinger Stacker"; 4 pages; Stinger Ltd.

* cited by examiner

*Primary Examiner*—Charles A. Fox
(74) *Attorney, Agent, or Firm*—Patrick M. Sheldrake; John William Stader; Michael G. Harms

(57) ABSTRACT

A clamping mechanism that is particularly suited for use as an attachment to a skid steer loader or forklift. The clamping mechanism can grasp both regularly and irregularly shaped objects between a moving clamp and retractable paddles.

16 Claims, 3 Drawing Sheets

FIG.1
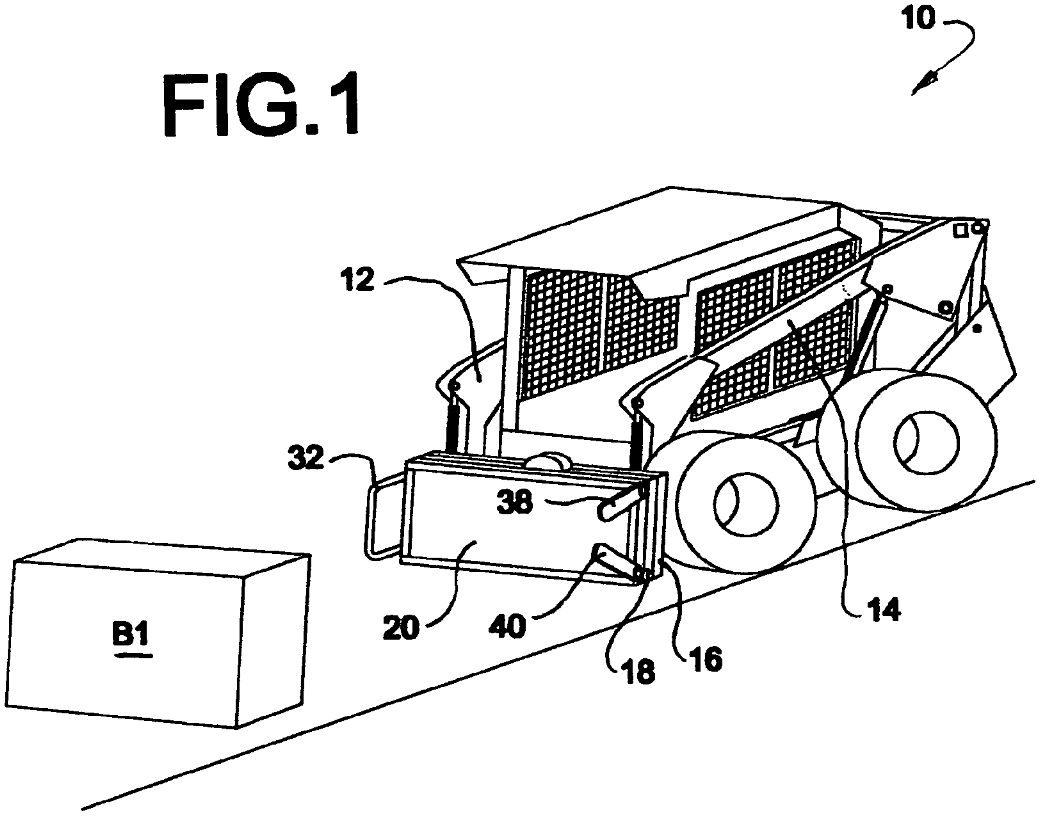
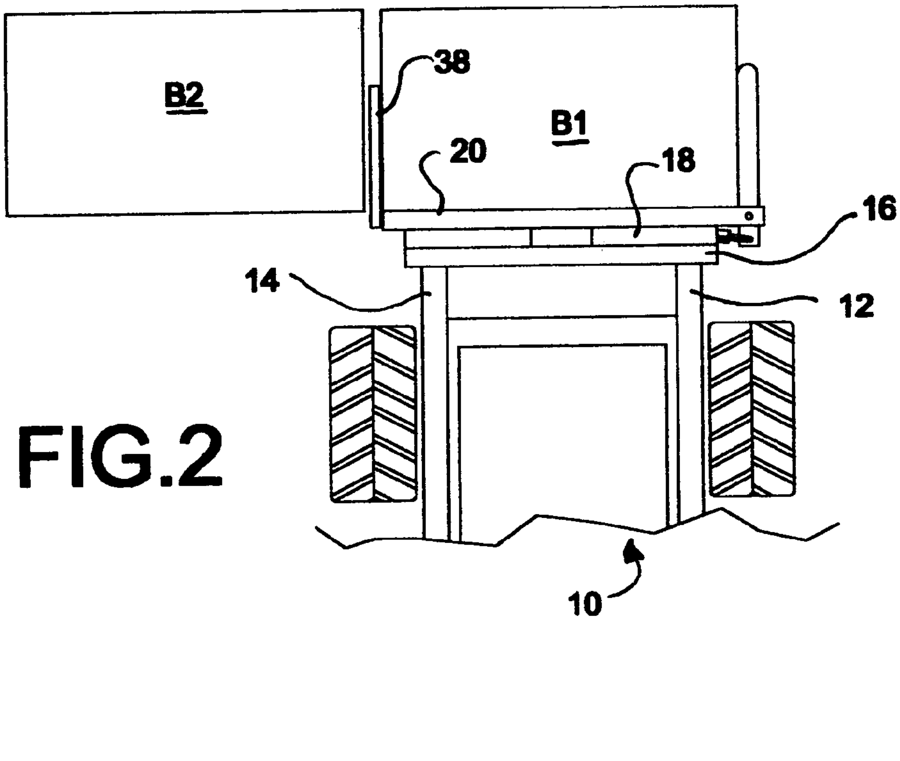
FIG.2

MATERIAL CLAMPING MECHANISM

CROSS-REFERENCE TO RELATED APPLICATIONS

This application is related to U.S. application Ser. No. 11/106,281, entitled "Big Bale Loader, Hauler and Stacker" in the name of the same inventor and filed on the same date as the instant application.

BACKGROUND OF THE INVENTION

The present invention relates generally to a clamp for grasping items for further handling, and more particularly to a clamp that precisely stacks regularly shaped crop bales, and readily grasps both regularly and irregularly shaped objects for further handling.

A large proportion of the resources and time of the agricultural industry is directed toward the production of feed for animals, and most specifically to the production of baled stem and leaf crops such as hay. The conventional process is to cut and condition the crop with a windrower, deposit it on the ground to dry, bale the crop when appropriately dry, and then position the bales in stacks for storage or transportation. These bales are produced in many shapes, from cylindrical ("round") to rectangular or cubical, and sizes. A significant issue with crop bales is stacking of the bales for storage, and the manipulation of those bales to create a tied stack that will withstand the pressures of weather and time. In mechanical bale handling systems, the manipulation step requires fairly precise positioning of bales, one on top of another, or spanning two others. Some such systems employ hooks, grapples or spears, damaging the bales, and sometimes even misplacing the bales during the necessary release step.

Another particular issue in material handling is the grasping of irregularly shaped objects, such as barrels or boulders. Clamping mechanisms are used in several material handling technologies, such as attachments for skid steer loaders, forklifts, and farm tractor loader booms. The problems with previous such mechanisms or assemblies is that they do not permit ready grasping of both regularly and irregularly shaped objects for movement, stacking or even selective dumping.

It would be a significant advantage to develop an improved clamping mechanism that permits grasping of both regularly and irregularly shaped objects for further manipulation.

SUMMARY OF THE INVENTION

Accordingly, it is an object of the present invention is to provide a material clamping mechanism that grasps both regularly and irregularly shaped objects for further manipulation.

Another object of the present invention is to provide a material clamping mechanism that permits the precise close stacking of regularly shaped objects.

It is another object of the instant invention to provide a clamping mechanism for a skid steer loader or forklift that permits the grasping of both regularly and irregularly shaped objects and the further manipulation thereof.

Yet another object of the present invention is to provide a clamping assembly for a material handling mechanism that uses a paddle system and clamping system mounted to a base plate.

It is yet another object of this invention to provide a manipulator that grasps either regularly or irregularly shaped objects by using a clamp on one side to push the object into solid contact with a pair of retractable paddles.

These and other objects are attained by providing a clamping mechanism that can grasp both regularly and irregularly shaped objects between a moving clamp and retractable paddles.

DESCRIPTION OF THE DRAWINGS

The advantages of this invention will be apparent upon consideration of the following detailed disclosure of the invention, especially when taken in conjunction with the accompanying drawings wherein:

FIG. 1 is a front oblique perspective view of a skid steer loader, showing the clamping mechanism as part of an attachment assembly;

FIG. 2 is partial top plan view of a skid steer loader, like shown in FIG. 1, placing one rectangularly shaped box being place closely adjacent another;

DESCRIPTION OF THE PREFERRED EMBODIMENT

Broadly, the clamping mechanism comprises a unique clamping structure, to be described further below, affixed to a faceplate. In one embodiment, the clamping mechanism is part of a crop bale manipulation mechanism of a bale stacking vehicle. In another embodiment, the clamp is affixed to a known attachment component of a skid steer loader, a forklift or farm tractor to create a more versatile attachment that can grasp objects to stack, move or even dump the contents.

Figure 4A:
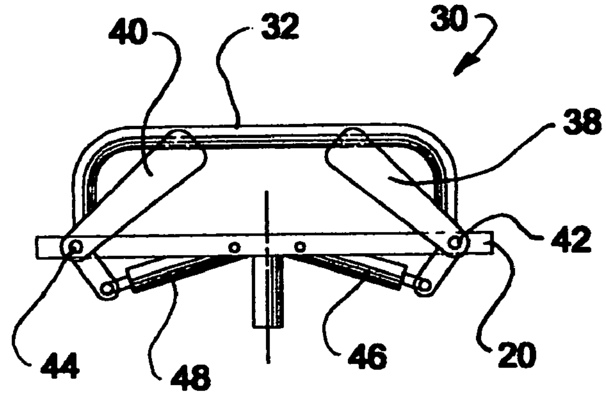
FIG. 4*a* is a left end partial view of the clamping attachment shown in the other figures.
Figure 4B:
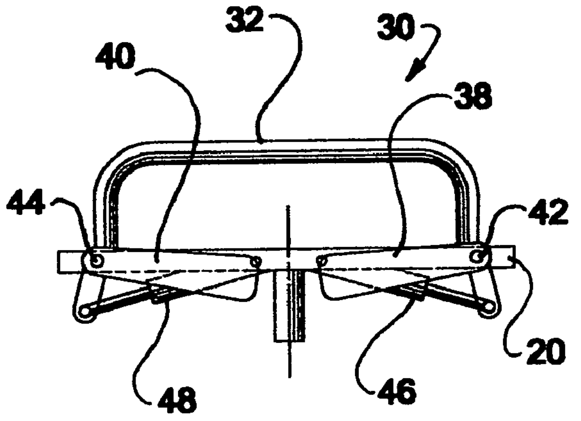
FIG. 4*b* is a left end partial view of the clamping attachment, similar to FIG. 4*a*, showing the paddles retracted.
Figure 5:
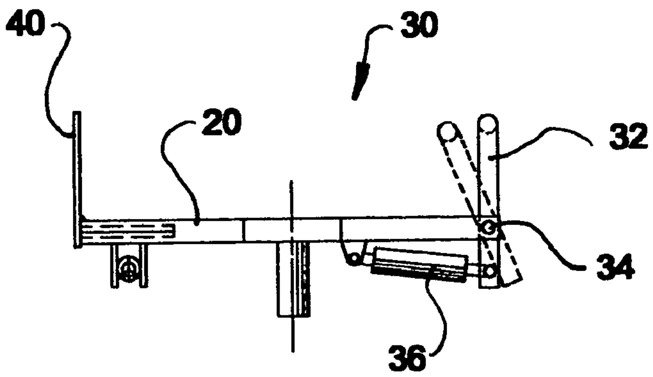
FIG. 5 is top plan view of the clamping mechanism showing the paddles raised and the movement of the bar clamp.

Attention is first directed to the copending patent application identified above in the section entitled "Cross-Reference to Related Applications". That application, and its drawings, are incorporated herein by reference in their entirety for the description of a bale loader, hauler and stacker. The bale mechanism of this application is shown in the incorporated application as part of the bale manipulator, and an improvement over other clamping devices that might be used therein. Once the bale is positioned on what is referred to in the incorporated application as the "manipulator table" by a loader, the clamping mechanism 30 (best seen FIGS. 4*a*, 4*b* and 5 hereof) clamps the bale to maintain secure and precise positioning for manipulation. Clamping mechanism 30 is comprised of two different clamping components, pivoting paddles (FIGS. 4*a* and 4*b*) on one side of the clamp faceplate 20 and an elongate bar on the other. Bar clamp 32 pivots about point 34 via activation of hydraulic cylinder 36 (FIG. 5). On the opposite side of clamp faceplate 20 are a pair 38, 40 of generally flat paddles pivotably attached, respectively, to faceplate 20 at pivot points 42, 44. Thus, the bale is clamped between paddles 38, 40 which pivot through the operation of hydraulic cylinders 46 and 48, in a plane generally perpendicular to clamp faceplate 20 and the side of the bale resting on faceplate 20, and bar clamp 32 that pivots into the opposing side of the bale. The pivoting paddles allow release of the clamped bale when positioned above or beside another bale; the paddles then being between the bales when the bale is positioned and then pivoted out from between the bales to release the positioned bale. Bar clamp 32 and paddles 38, 40 always pivot open into an unoccupied space.

The thin paddles and the fact that they merely have to pivot into and out of the working position allows the bale to be positioned very closely adjacent a preceding bale, precisely on top of another bale or precisely over the end portions of two other adjacently pre-positioned bales. The paddles can pivot out between two bales without moving or damaging either.

Attention is now directed to FIGS. 1 and 2 for a description of an embodiment for use with a skid steer loader. Skid steer loader 10 of well known design includes boom arms 12 and 14 that act in unison to lift and lower a boom faceplate 16 connected between the two at the forward end thereof. The normal operational interaction between the boom and boom faceplate would allow the faceplate to selectively pivot forwardly and rearwardly through the action of hydraulic cylinders (not shown). It should be noted here that while a skid steer loader is shown and described, a forklift or a tractor with a boom affixed would provide the same, or at least similar, foundation for the clamping mechanism described.

Because the paddles 38, 40 rotate in a plane essentially perpendicular to a base side of the clamping mechanism 30, objects being handled, especially cubic or parallelepiped objects, can be placed very closely adjacent to one another (see FIG. 2—as close as the thickness of the paddle). Furthermore, when the paddles are rotated out of clamping position past the side of the clamp faceplate 20, the bar clamp 32 can be used to crowd the placed object against the previously placed object or a wall. Also, because the paddles have a fairly large surface area, they would be an effective backstop or clamping surface for the clamping and handling of irregularly shaped objects, such as a barrel or boulder.

A rotatable attachment 18 is affixed to the boom faceplate 16 to allow selective rotation of the clamp faceplate 20 in either clockwise or counter-clockwise directions. Attachments such as 18 are known in the art, as shown for example in U.S. Pat. No. 5,938,399 to Knutson. For completeness, the Knutson patent is incorporated herein in its entirety.

The clamp faceplate 20 is then mounted onto the rotatable attachment 18. Depending upon the design of attachment 18, clamp faceplate 20 may have to be adapted slightly to properly fit; however, such adaptation would be well within the skill of one knowledgeable in the technology. In fact, the rotatable attachment itself is an expansion of the basic concept. In other words, the clamp 30 could be mounted directly to the boom faceplate 16 without using the rotatable attachment 18. Of course, the resulting clamping mechanism would not have the versatility of the more complex embodiment, but it would be quite satisfactory for lifting and stacking if no further manipulation of the object being handled was required. Examples of objects that could conveniently be handled with the simpler embodiment are small or big square bales, round bales, boxes and crates . . . all clamped on the sides. When these objects are placed into a storage area, they can be placed closely adjacent as described above. Objects like boxes and crates would not need a pallet base designed for forks, yet could be stacked and placed closely adjacent to one another to conserve space.

Figure 3:
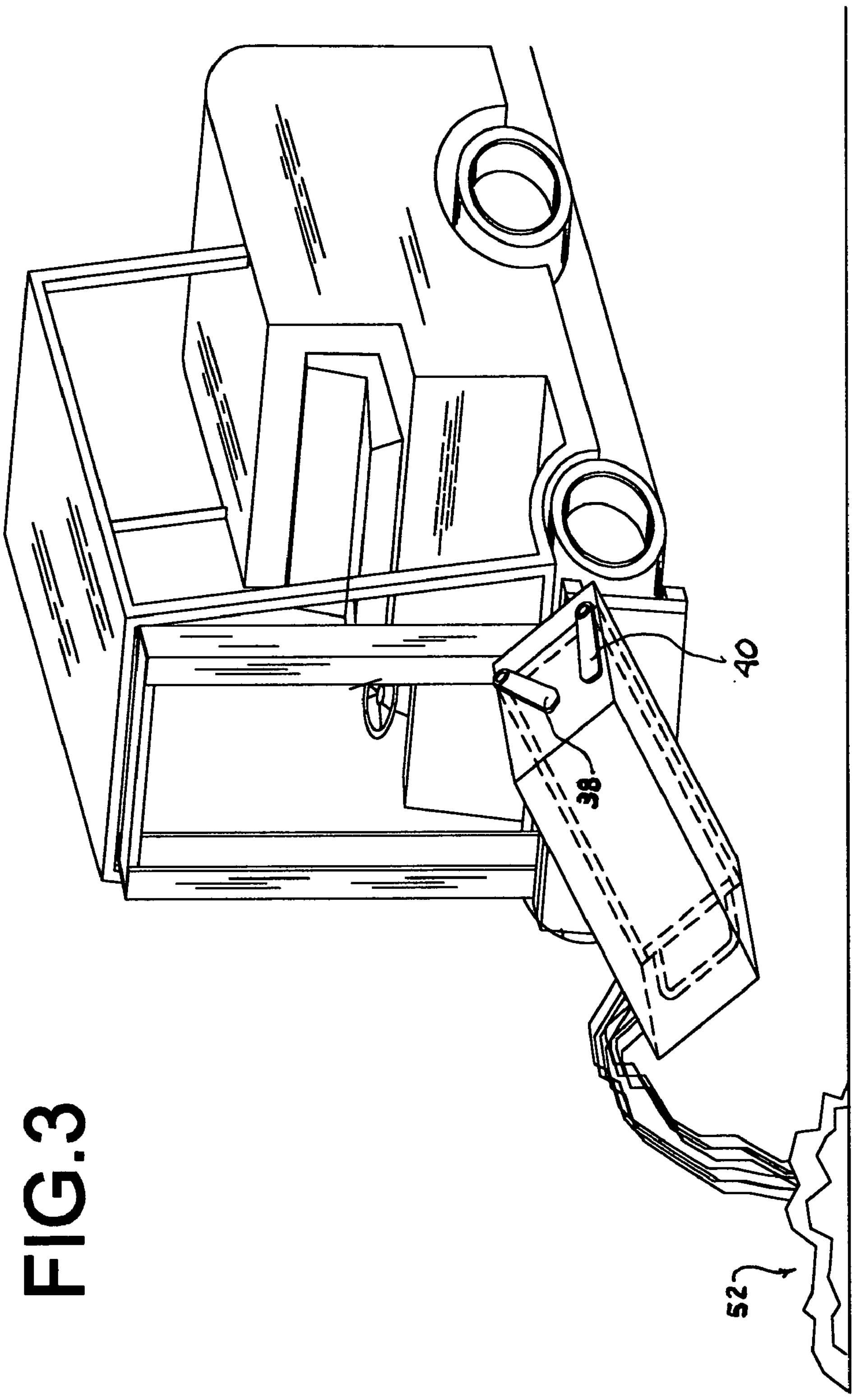
FIG. 3 is a front perspective view, similar to FIG. 1, showing the contents of a box being dumped to the right side of a forklift.

In operation of the embodiment shown in the figures, particularly FIG. 1, loader 10 would approach an object, such as box B1, locating the box between paddles 38, 40 and bar clamp 32, and against clamp faceplate 20. Bar clamp 32 is then activated, pivoting into contact with the box B1 and pushing it against paddles 38, 40. The box B1 can then be picked up and moved to a new location, such as adjacent a similar box B2, as shown in FIG. 2. It is also quite feasible to marry the clamping mechanism with a forklift, as shown as 50 in FIG. 3, with the rotatable attachment to pour or dump materials 52 from a container onto the ground or into another container.

It will be understood that changes in the details, materials, steps and arrangements of parts which have been described and illustrated to explain the nature of the invention will occur to, and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A material clamping mechanism comprising:

a clamping plate having first and second opposing edges ends, said clamping plate having a first planar surface in a first plane, said first plane having a first side and an opposing second side;

a generally planar first paddle pivotably supported by said clamping plate for selective movement in a second plane generally perpendicular to said first plane and adjacent said first end of said clamping plate from a first open position where said first paddle is mostly on said first side of said first plane and a second closed position where most of said paddle is mostly on said second side of said first plane;

an elongate clamping member pivotably supported by said clamping plate adjacent said second end of said clamping plate for arcuate movement about an axis generally parallel to said second plane from a position generally perpendicular to the clamping plate towards the surface of said clamping plate;

said first paddle and said clamping member being pivotable through a power source.

2. The material clamping mechanism of claim 1, further including:

a generally planar second paddle pivotably supported by said clamping plate for selective movement in said second plane and adjacent said first end of said clamping plate spaced from said first paddle from a first open position where said second paddle is mostly on said first side of said first plane and a second closed position where most of said second paddle is mostly on said second side of said first plane;

said first and second paddles pivotable in counter directions.

3. The material clamping mechanism of claim 2, wherein: said power source is hydraulic.

4. The material clamping mechanism of claim 3, wherein: said power source is respective hydraulic cylinders.

5. The material clamping mechanism of claim 4, wherein: said clamping plate is affixed to a rotatable attachment that provides selective rotation of said clamping plate.

6. The material clamping mechanism of claim 1, wherein: said clamping plate is affixed to a rotatable attachment that provides selective rotation of said clamping plate.

7. The material clamping mechanism of claim 6, wherein: said clamping member is a rod substantially coextensive with said second end of said clamping plate.

8. The material clamping mechanism of claim 1, wherein: said clamping plate is affixed to a rotatable attachment which itself is supported on said boom faceplate providing selective rotation of said clamping plate.

9. The material clamping mechanism of claim 8, wherein:

said clamping member is a rod substantially coextensive with said second end of said clamping plate.

10. A material clamping mechanism comprising:

a clamping plate having first and second opposing ends, said clamping plate having a first planar surface in a first plane, said first plane having a first side and an opposing second side;

generally planar first and second paddles pivotably supported by said clamping plate for selective movement in a second plane generally perpendicular to said first plane and adjacent said first end of said clamping plate from a first open position where said first and second paddles are mostly on said first side of said first plane and a second closed position where most of said first and second paddles are mostly on said second side of said first plane;

an elongate clamping member pivotably supported by said clamping plate adjacent said second end of said clamping plate for arcuate movement about an axis generally parallel to said second plane from a position generally perpendicular to the clamping plate towards the surface of said clamping plate;

said first and second paddles and said clamping member being pivotable through hydraulic cylinders.

11. The material clamping mechanism of claim 10, wherein:

said clamping plate is affixed to a rotatable attachment that provides selective rotation of said clamping plate.

12. In a skid steer loader having a boom and a boom faceplate, the improvement comprising:

a clamping plate supported on said boom faceplate and having top, bottom and first and second opposing ends, said clamping plate having a first planar surface in a first plane, said first plane having a first side and an opposing second side;

a generally planar first paddle pivotably supported by said clamping plate for selective movement in a second plane generally perpendicular to said first plane and adjacent said first end of said clamping plate from a first open position where said first paddle is mostly on said first side of said first plane and a second closed position where most of said paddle is mostly on said second side of said first plane;

an elongate clamping member pivotably supported by said clamping plate adjacent said second end of said clamping plate for arcuate movement about an axis parallel to said second plane from a position generally perpendicular to the clamping plate towards the surface of said clamping plate;

said first paddle and said clamping member being pivotable through a power source.

13. The material clamping mechanism claim 12, further including:

a generally planar second paddle pivotably supported by said clamping plate for selective movement in said second plane and adjacent said first end of said clamping plate spaced from said first paddle from a first open position where said second paddle is mostly on said first side of said first plane and a second closed position where most of said second paddle is mostly on said second side of said first plane;

said first and second paddles pivotable in counter directions.

14. The material clamping mechanism of claim 13, wherein:

said power source is hydraulic.

15. The material clamping mechanism of claim 14, wherein:

said power source is respective hydraulic cylinders.

16. The material clamping mechanism of claim 15, wherein:

said clamping plate is affixed to a rotatable attachment that provides selective rotation of said clamping plate.

* * * * *